United States Patent Office 2,889,296
Patented June 2, 1959

2,889,296

PROCESS FOR PREPARING HIGH QUALITY ASPHALT-COPOLYMER COMPOSITIONS

Kenneth G. Morris, Cranford, Joseph C. Roediger, Westfield, Raymond G. Newberg, Roselle Park, and Andrew F. Sayko, Westfield, N.J., assignors to Esso Research and Engineering Company, a corporation of Delaware No Drawing. Application July 15, 1955
Serial No. 522,372

3 Claims. (Cl. 260—28.5)

The present invention is concerned with an improved process for the preparation of high quality petroleum asphalts. The invention more particularly relates to the preparation of an improved asphalt composition by air blowing a petroleum asphalt in the presence of a high molecular weight hydrocarbon polymer. In accordance with the invention a high quality asphalt suitable as a paper laminant, crack sealer, and the like, is prepared by adding a high molecular weight isobutylene-styrene copolymer to a suitable asphalt base stock and then oxidizing the mixture to the desired asphalt grade.

The production of oxidized asphalts by blowing air through a petroleum residue or straight run asphalt at elevated temperatures is well known in the art. This technique has a decided effect upon and improves some of the physical properties of the asphalt. In general, this technique serves to improve the temperature susceptibility characteristics. It is to be noted that the hardness of a straight run asphalt may be greatly increased by extensive steam or vacuum distillation of the asphalt, but the resulting product in this instance is generally more susceptible to temperature changes. The air-blowing technique, in comparison with the vacuum distillation method, is capable of producing an asphaltic product of greater pliability but of the same hardness as an asphaltic product produced by vacuum distillation of the same straight run asphalt. As a result of their very desirable hardness, pliability and weathering resistance qualities, oxidized asphalts have become very popular in the production of roofing asphalts, protective coatings, electrical insulating compositions, moulded articles, and the like. In general, oxidized asphalts are available having softening points of about 100° F. to 250° F. or more and penetrations of about 200 down to about 10 (100 g./5 sec./ 77° F.). By comparison, straight reduced asphalts are generally available possessing softening points of about 100° F. to 170° F. and having penetration values of about 200 down to 10 or 20 (100 g./5 sec./77° F.).

Oxidized asphalts have been used for many years for paper laminants, crack sealers, and a variety of other uses where their high softening point and good temperature susceptibility characteristics are required. By varying the consistency of the oxidation bases, asphalt producers have been able to vary oxidized asphalt properties to meet most of the requirements. Thus, penetration at 77° F., for example, can be varied over a wide range for a given softening point merely by changing the oxidation base. However, while oxidized asphalts show good temperature susceptibility, they are limited in ductility due to their gel type structure.

In order to overcome this shortcoming of oxidized asphalts it has been found advantageous to incorporate into such asphalts certain high molecular weight hydrocarbon polymers. Broadly these hydrocarbon polymers are hydrocarbon copolymers of the general class of copolymers of polymerizable hydrocarbon containing a cyclic nucleus, and an aliphatic olefin or alkene, as, for example, a copolymer of styrene and isobutylene. United States Patent No. 2,274,749, issued March 3, 1942, describes copolymers of the general class referred to above, such as copolymers of styrene and isobutylene, and describes preparation thereof by copolymerizing the reactants at temperatures below 0° C. using a Friedel-Crafts halide catalyst such as boron fluoride or aluminum chloride, with or without substances such as propane, ethylene, or chlorinated hydrocarbons as diluents, solvents or refrigerants. By adjusting the proportion of the two raw materials, copolymers of any desired hardness, melting point or elasticity may be obtained. For example, the copolymer may comprise from 10% to 60% of styrene as compared to 90% to 40% by volume of isobutylene.

The following data illustrate the improved properties of asphaltic compositions prepared by the addition of a styrene-isobutylene copolymer to an asphalt flux followed by air-blowing.

| Percent copolymer added before oxidation | 0 | 2 |
|---|---|---|
| Inspections of products: | | |
| Softening point, ° F | 188 | 184 |
| Pen., 77° F./100 g./5" | 27 | 31 |
| Pen., 32° F./200 g./60" | 18 | 19 |
| Pen., 115° F./50 g./5" | 48 | 58 |
| Ductility, 77° F. (5 cm./min.), in | 3 | 39 |
| Ductility, 39.2° F. (5 cm./min.), in | 2.5 | 4 |
| Oxidation time in minutes | 320 | 205 |

The foregoing data show that products prepared with styrene-isobutylene polymer followed by air-blowing are much improved in (1) penetrations at 77° F. and 32° F. and (2) ductilities at 77° F. and 39.2° F., over regular oxidized asphalts of the same softening point.

The temperatures employed for oxidizing the asphalt-copolymer composition are generally in the range from about 400–600° F. with usual operation in the range from about 450–525° F.

While 2% of a polymer containing 50% isobutylene-50% styrene was used in the operations illustrated in the above table, it is to be understood that other concentrations of polymers as well as different polymers may be employed. For example, the polymer may comprise 40% styrene and 60% isobutylene or 60% styrene and 40% isobutylene. The concentrations of the polymers employed may be in the range from 0.5% by weight to about 20% by weight.

As pointed out, asphalt coatings normally have been prepared by oxidation of lower consistency asphalt materials, the resulting products being usually low in ductility, and copolymers have then been added to improve ductility. The improved process of the present invention permits the preparation of asphalt compositions containing styrene-isobutylene copolymers in a much shorter time and more economical manner than has been practiced heretofore. The products prepared by this process are particularly advantageous from the standpoint of ductility and are suitable for the lamination of paper, fabrics and many other materials.

The invention having been described, what is claimed is:

1. A process for the preparation of a high quality laminating material which comprises adding from about 0.25 to about 20% by weight of a high molecular weight copolymer of isobutylene and styrene to a petroleum asphalt base stock and thereafter air-blowing said base stock and copolymer at a temperature in a range between 400 and 600° F. to a softening point between about 100° F. to about 250° F.

2. A process as defined by claim 1 wherein from about 1% to about 5% by weight of said copolymer is added to said base stock prior to air-blowing.

3. A process as defined by claim 1 wherein said copolymer contains from about 20% to 80% styrene and about 80% to 20% isobutylene.

References Cited in the file of this patent

UNITED STATES PATENTS 2,734,882    Kirsch ---------------- Feb. 14, 1956

FOREIGN PATENTS 927,636    France ---------------- May 5, 1947